(12) United States Patent
Mizoguchi

(10) Patent No.: US 7,515,323 B2
(45) Date of Patent: Apr. 7, 2009

(54) ACTUATOR, OPTICAL SCANNER AND IMAGE FORMING APPARATUS

(75) Inventor: Yasushi Mizoguchi, Chino (JP)

(73) Assignee: Seiko Epson Corporation, Tokyo (JP)

( * ) Notice: Subject to any disclaimer, the term of this patent is extended or adjusted under 35 U.S.C. 154(b) by 42 days.

(21) Appl. No.: 11/873,539

(22) Filed: Oct. 17, 2007

(65) Prior Publication Data

US 2008/0094677 A1 Apr. 24, 2008

(30) Foreign Application Priority Data

Oct. 19, 2006 (JP) ............................. 2006-285450

(51) Int. Cl.
*G02B 26/08* (2006.01)
(52) U.S. Cl. ........................ 359/224; 359/198; 359/199; 310/311
(58) Field of Classification Search .................. 359/224
See application file for complete search history.

(56) References Cited

U.S. PATENT DOCUMENTS 7,446,919 B2 * 11/2008 Wood .......................... 359/224

2008/0144154 A1 * 6/2008 Asai ............................ 359/224

FOREIGN PATENT DOCUMENTS

JP 2004-191953 7/2004

* cited by examiner

*Primary Examiner*—James Phan
(74) *Attorney, Agent, or Firm*—Workman Nydegger

(57) ABSTRACT

An actuator includes: a mass portion; a vibrating part having a pair of elastic portions supporting the mass portion; at least one pair of beam portions supporting the vibrating part; a piezoelectric element bonded on each of the beam portions; voltage applying means that applies voltage to each of the piezoelectric elements so that each of the beam portions is bended to be deformed so as to drive the vibrating part, in which the voltage applying means includes: a first voltage generating part that generates first voltage periodically changing with a first frequency; a second voltage generating part that generates second voltage periodically changing with a second frequency different from the first frequency; and a voltage superimposing part that superimposes the first voltage and the second voltage, and in which the voltage superimposed at the voltage superimposing part is applied to each of the piezoelectric elements to allow the mass portion to rotate about the first axis extending along the pair of elastic portions with the first frequency while rotating about the second axis intersecting with the first axis with the second frequency.

13 Claims, 7 Drawing Sheets

ACTUATOR, OPTICAL SCANNER AND IMAGE FORMING APPARATUS

BACKGROUND OF THE INVENTION

1. Technical Field

The present invention relates to an actuator, an optical scanner and an image forming apparatus.

2. Related Art

As an example of optical scanners used for, for example, laser printers, there is known one, which employs a structure having a torsional resonator, which is manufactured by processing a Si substrate with a micromachining technique. The optical scanner employing such the structure can advantageously perform light scanning at higher velocity than one employing a polygon mirror.

The actuator as disclosed in, for example, JP-A-2004-191953, has a plate-shaped reflecting mirror, which is supported from either side by a pair of spring portions. The respective spring portion branches off halfway, and a piezoelectric body is provided at each of the bifurcation. In the case of the actuator thus constructed, voltage is applied to the each of the piezoelectric bodies so as to bend the respective bifurcations to be deformed, thereby allowing the reflecting mirror to rotate while twisting the pair of spring portions as a whole to be deformed.

In the case of such the actuator, the mirror is allowed to rotate only about one axis extending along the one pair of spring portions as the center axis of rotation. Therefore, when such the actuator is used as an optical scanner, light can be irradiated either in the direction of main scanning or in the direction of sub-scanning. Accordingly, in order to perform both the main scanning and the sub-scanning, two actuator of this type must be used, which disadvantageously involving increase in cost and growth in size.

SUMMARY

An advantage of the present invention is to provide an actuator, an optical scanner and an image forming apparatus allowing a mass portion to rotate respectively about two axes intersecting with each other while achieving reduction in cost and miniaturization.

An actuator according to first aspect of the invention includes: a mass portion; a vibrating part having a pair of elastic portions supporting the mass portion; at least one pair of beam portions supporting the vibrating part; a piezoelectric element bonded on each of the beam portions; voltage applying means that applies voltage to each of the piezoelectric elements so that each of the beam portions is bended to be deformed so as to drive the vibrating part, in which the voltage applying means includes: a first voltage generating part that generates first voltage periodically changing with a first frequency; a second voltage generating part that generates second voltage periodically changing with a second frequency different from the first frequency; and a voltage superimposing part that superimposes the first voltage and the second voltage, and in which the voltage superimposed at the voltage superimposing part is applied to each of the piezoelectric elements to allow the mass portion to rotate about the first axis extending along the pair of elastic portions with the first frequency while rotating about the second axis intersecting with the first axis with the second frequency.

As a result, it becomes possible to allow the mass portion to rotate respectively about two axes intersecting with each other while achieving reduction in cost and miniaturization.

It is preferable that in the voltage applying means, the first voltage generating part generate two kinds of the first voltage, the two kinds of the first voltage being out of phase with each other by 180°, the voltage superimposing part superimpose each of the two kinds of the first voltage and the second voltage so that the superimposed voltage at the voltage superimposing part is applied corresponding to a pair of the piezoelectric elements.

Accordingly, it becomes possible to allow the mass portion to rotate about the first axis extending along the pair of elastic portions with the first frequency while rotating about the second axis with the second frequency by employing a relatively simple construction.

It is preferable that the vibrating part be supported by the at least one pair of beam portions, support the mass portion through the pair of beam portions, and be provided with a frame body having a frame-like shape surrounding the outer periphery of the mass portion.

Accordingly, it becomes possible to allow the mass portion to rotate more smoothly about the first axis extending along the pair of elastic portions with the first frequency while rotating about the second axis with the second frequency by using lower power.

It is preferable that the beam portions be arranged in pairs through the vibrating part on the either side of the vibrating parts.

As a result, it becomes possible to allow the mass portion to rotate more smoothly about the first axis extending along the pair of elastic portions with the first frequency while rotating about the second axis with the second frequency.

It is preferable that: the mass portion have a plate-like shape; and the two pairs of beam portions be arranged in a point symmetrical manner with respect to the center of the mass portion seen in a plan view of the mass portion.

Accordingly, it becomes possible to allow the mass portion to rotate more smoothly about the first axis extending along the pair of elastic portions with the first frequency while rotating about the second axis with the second frequency by employing a simpler construction.

It is preferable that: each of the beam portions extend in longitudinal direction; and each of the piezoelectric elements extend in the longitudinal direction and telescope in the extension direction of the beam portions to bend the beam portions to be deformed.

As a result, it becomes possible to allow the mass portion to rotate about the first axis extending along the pair of elastic portions with the first frequency while rotating about the second axis with the second frequency with larger rotating angle and by using lower power.

It is preferable that each of the beam portions extend in parallel with the first axis.

As a result, it becomes possible to achieve reduction in size of the actuator while making the rotating angle of the mass portion larger.

It is preferable that each of the piezoelectric elements be arranged across substantially the entire region of the corresponding beam portion in the longitudinal direction.

Accordingly, it becomes possible to achieve reduction in size of the actuator while making the rotating angle of the mass portion larger.

It is preferable that the first frequency be larger than the second frequency.

As a result, it becomes possible to allow the mass portion to rotate more smoothly and reliably about the first axis extending along the pair of elastic portions with the first frequency while rotating about the second axis with the second frequency.

It is preferable that the first frequency be the same as the torsion resonance frequency of the vibrating system constructed by the mass portion and the vibrating part.

Accordingly, it becomes possible to allow the mass portion to rotate more smoothly and reliably about the first axis extending along the pair of elastic portions with the first frequency while rotating about the second axis with the second frequency, so that the mass portion can more widely rotate with lower power.

It is preferable that the mass portion include a light reflecting part having light reflecting properties.

As a result, the actuator according to the invention can be applied to optical devices such as an optical scanner, an optical switch or a light attenuator.

An optical scanner according to a second aspect of the invention includes: a vibrating part having a mass portion having a light reflecting part having light reflecting properties and a pair of elastic portions supporting the mass portion; at least one pair of beam portions capable of being bended to be deformed and supporting the vibrating part; a piezoelectric element bonded on each of the beam portions; and voltage applying means that applies voltage to each of the piezoelectric elements so that each of the beam portions is bended to be deformed so as to drive the vibrating part and light reflected at the light reflecting part is used for scanning, in which the voltage applying means includes: a first voltage generating part that generates a first voltage periodically changing with a first frequency; a second voltage generating part that generates a second voltage periodically changing with a second frequency different from the first frequency; and a voltage superimposing part that superimposes the first voltage and the second voltage; and in which the superimposed voltage at the voltage superimposing part is applied to each of the piezoelectric elements to allow the mass portion to rotate about the first axis extending along the pair of elastic portions with the first frequency while rotating about the second axis intersecting with the first axis with the second frequency.

As a result, it becomes possible to perform main scanning and sub-scanning by using one optical scanner, so that the reduction in cost and miniaturization can be achieved.

An image forming apparatus according to a third aspect of the invention includes: a vibrating part having a mass portion having a light reflecting part having light reflecting properties and a pair of elastic portions supporting the mass portion; at least one pair of beam portions capable of being bended to be deformed and supporting the vibrating part; a piezoelectric element bonded on each of the beam portions; light irradiating means that irradiates the light reflecting part with light; and voltage applying means that applies voltage to each of the piezoelectric elements so that each of the beam portions is bended to be deformed so as to drive the vibrating part and light reflected at the light reflecting part is used for scanning to form image on an object, in which the voltage applying means includes: a first voltage generating part that generates a first voltage periodically changing with a first frequency; a second voltage generating part that generates a second voltage periodically changing with a second frequency different from the first frequency; and a voltage superimposing part that superimposes the first voltage and the second voltage; and in which the superimposed voltage at the voltage superimposing part is applied to each of the piezoelectric elements to allow the mass portion to rotate about the first axis extending along the pair of elastic portions with the first frequency while rotating about the second axis intersecting with the first axis with the second frequency.

As a result, it becomes possible to perform main scanning and sub-scanning by using one optical scanner, so that the reduction in cost and miniaturization can be achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferred embodiment of the present invention will be described with reference to the attached drawings.

Figure 1:
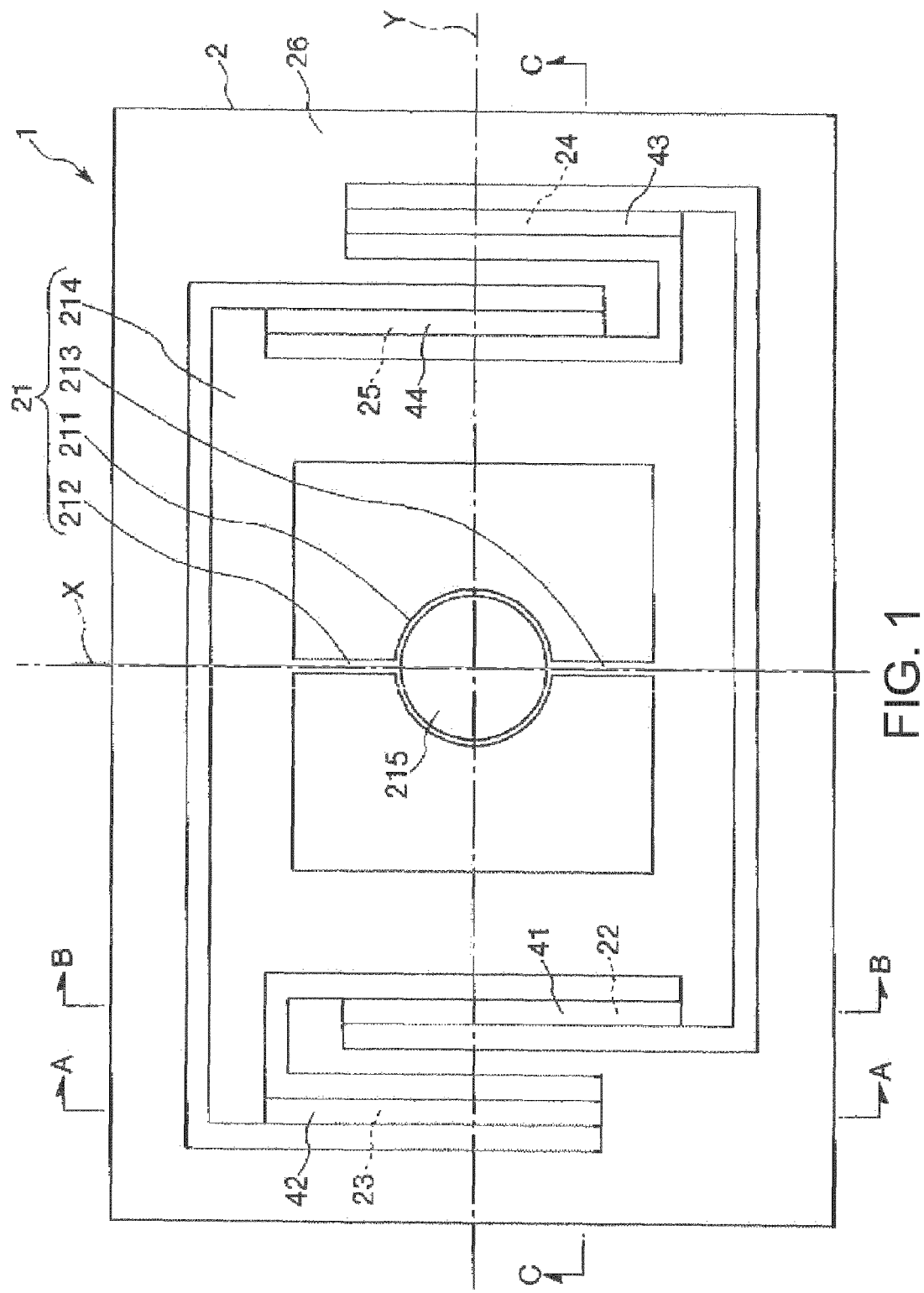
FIG. 1 is a plan view showing an actuator according to an embodiment of the invention.
Figure 2A:
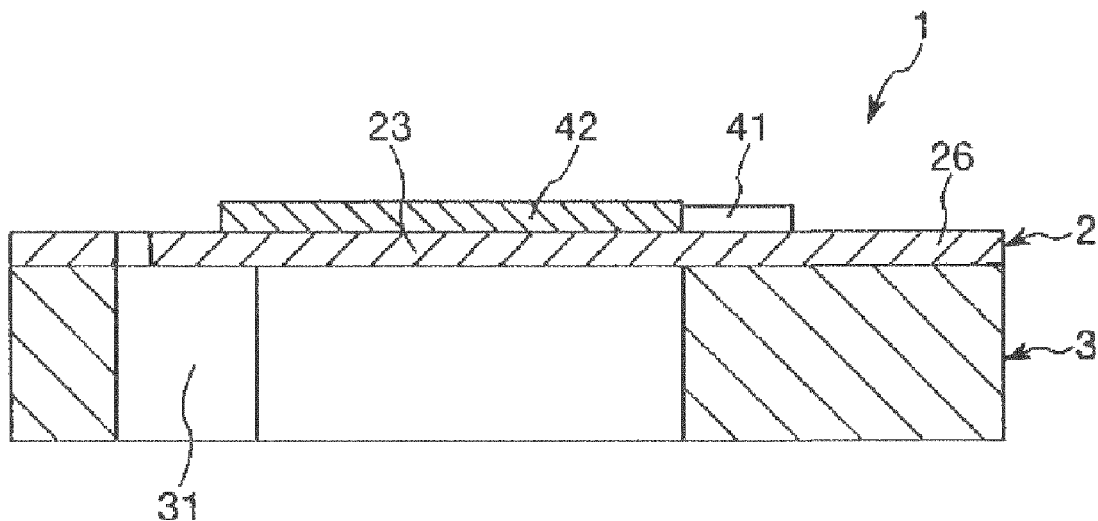
FIG. 2A is a sectional view taken along with the line A-A of FIG. 1.
Figure 2B:
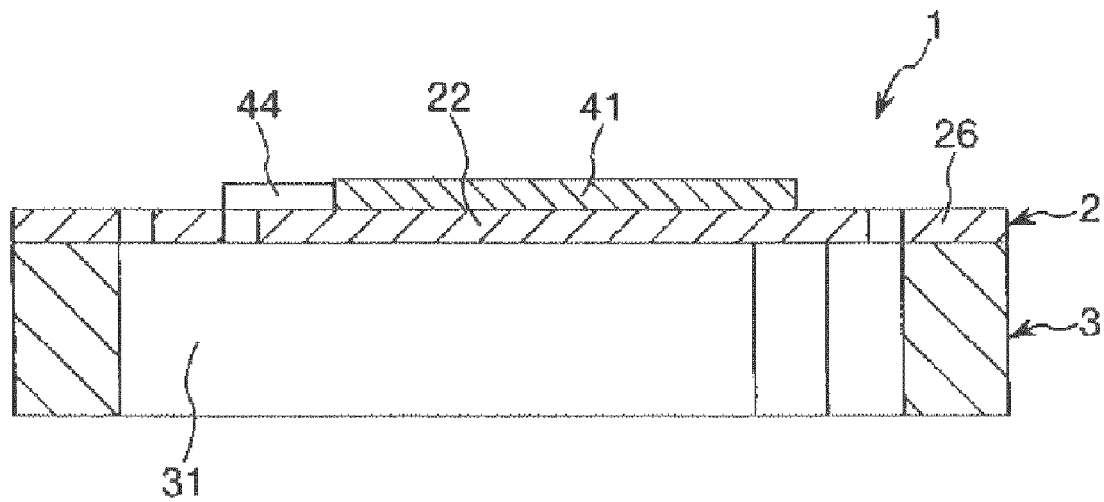
FIG. 2B is a sectional view taken along with the line B-B of FIG. 1.
Figure 3:
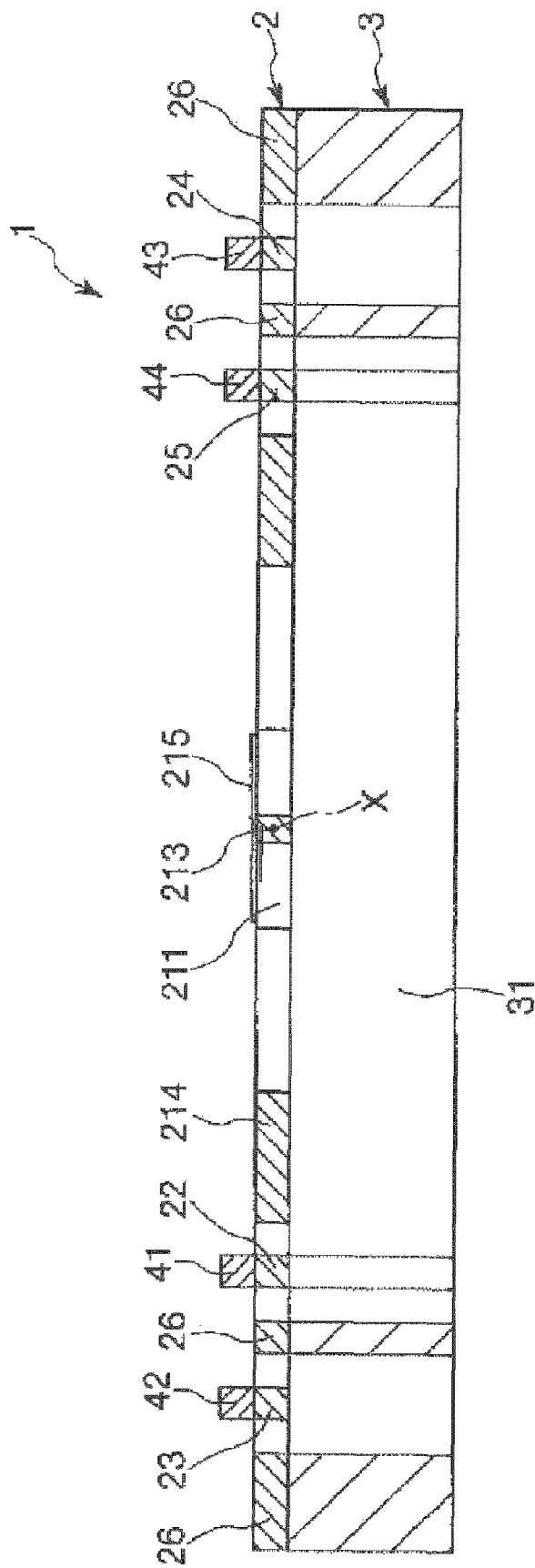
FIG. 3 is a sectional view taken along with the line C-C of FIG. 1.
Figure 4:
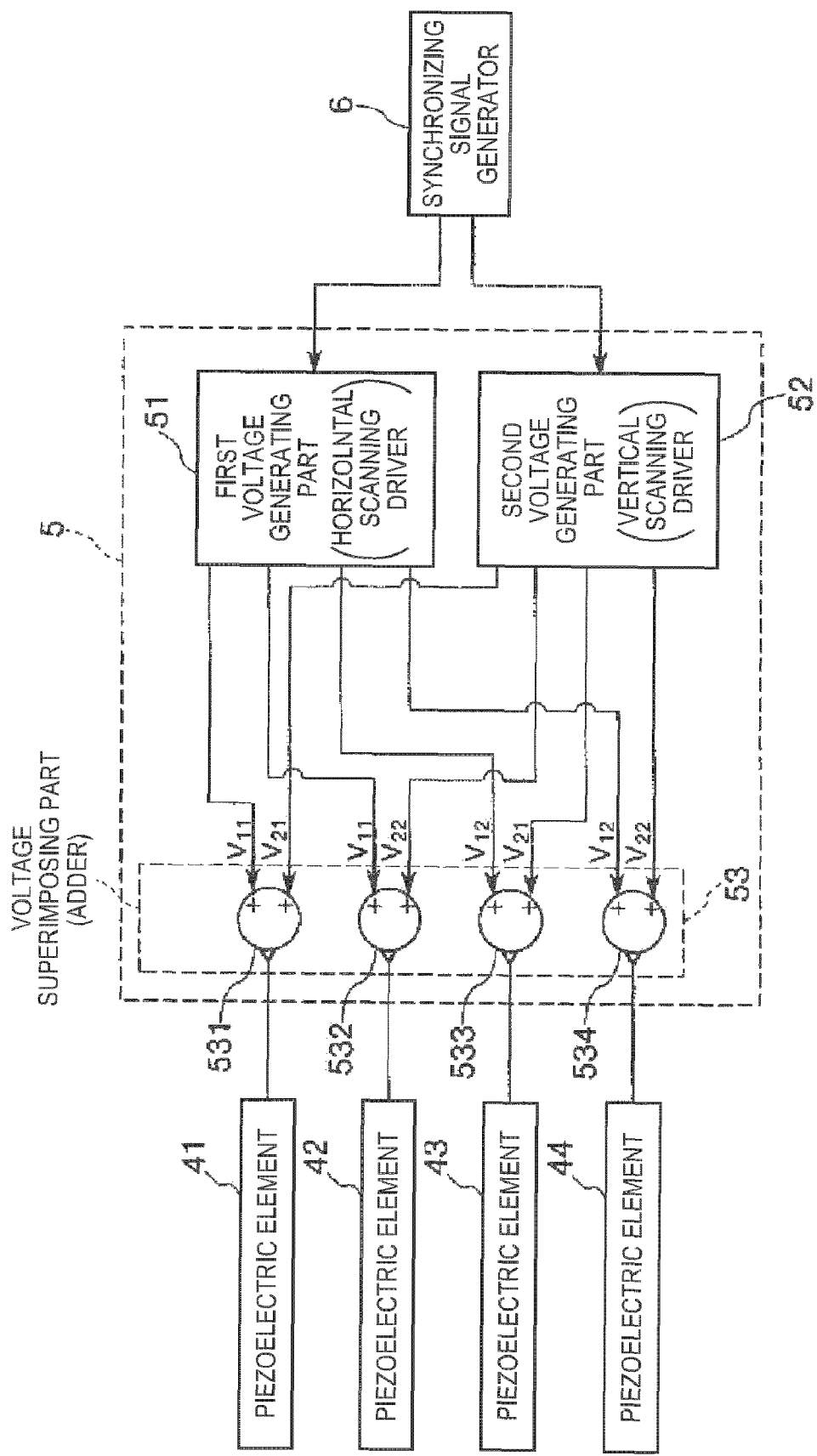
FIG. 4 is a block diagram illustrating the configuration of a control system of the actuator shown in FIG. 1.
Figure 5:
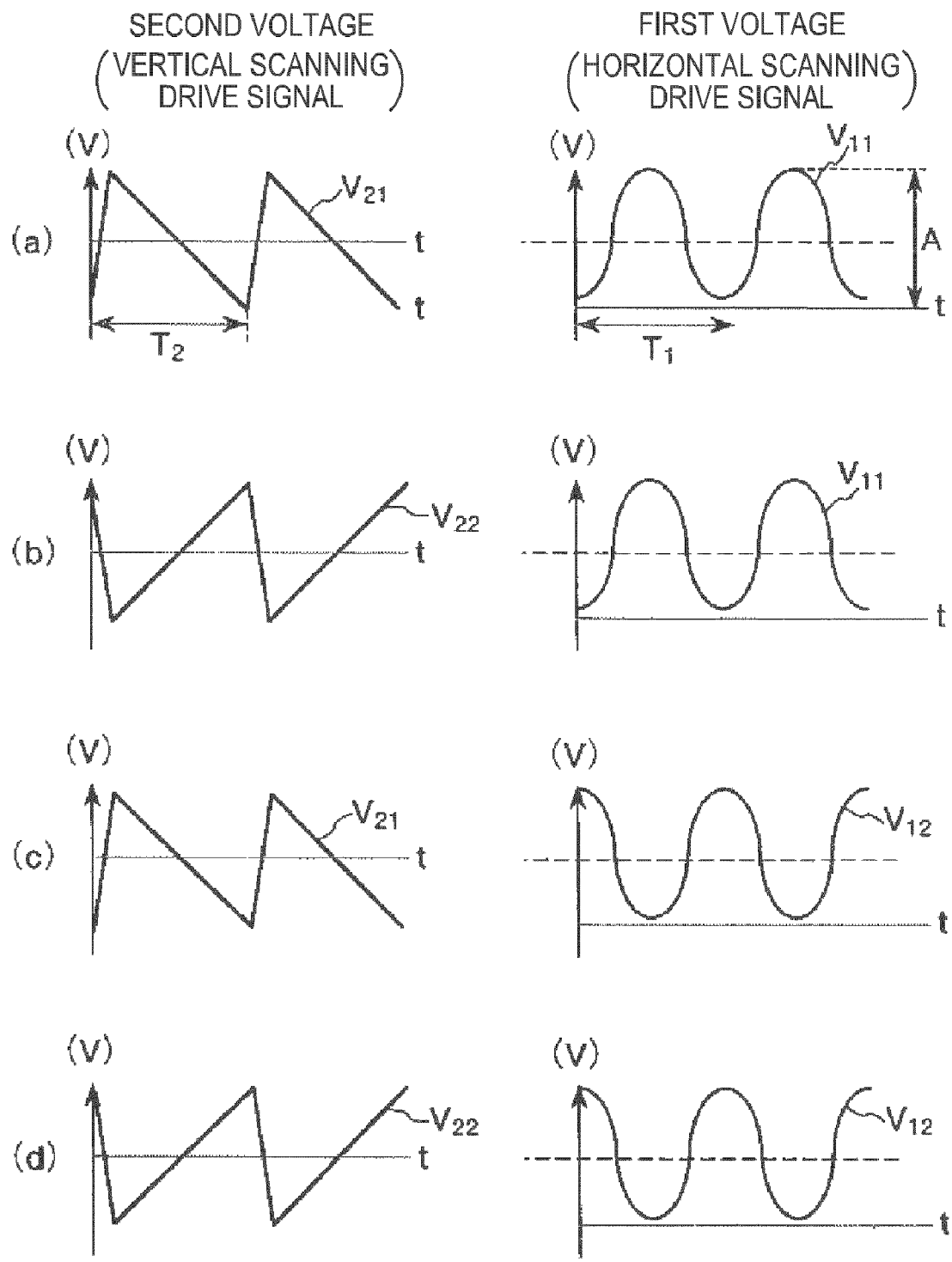
FIG. 5A is a view showing an exemplary generated voltage of a first voltage generating part and a second voltage generating part shown in FIG. 4.
FIG. 5B is a view showing an another exemplary generated voltage of a first voltage generating part and a second voltage generating part shown in FIG. 4.
FIG. 5C is a view showing a further exemplary generated voltage of a first voltage generating part and a second voltage generating part shown in FIG. 4.
FIG. 5D is a view showing a yet further exemplary generated voltage of a first voltage generating part and a second voltage generating part shown in FIG. 4.
Figure 6:
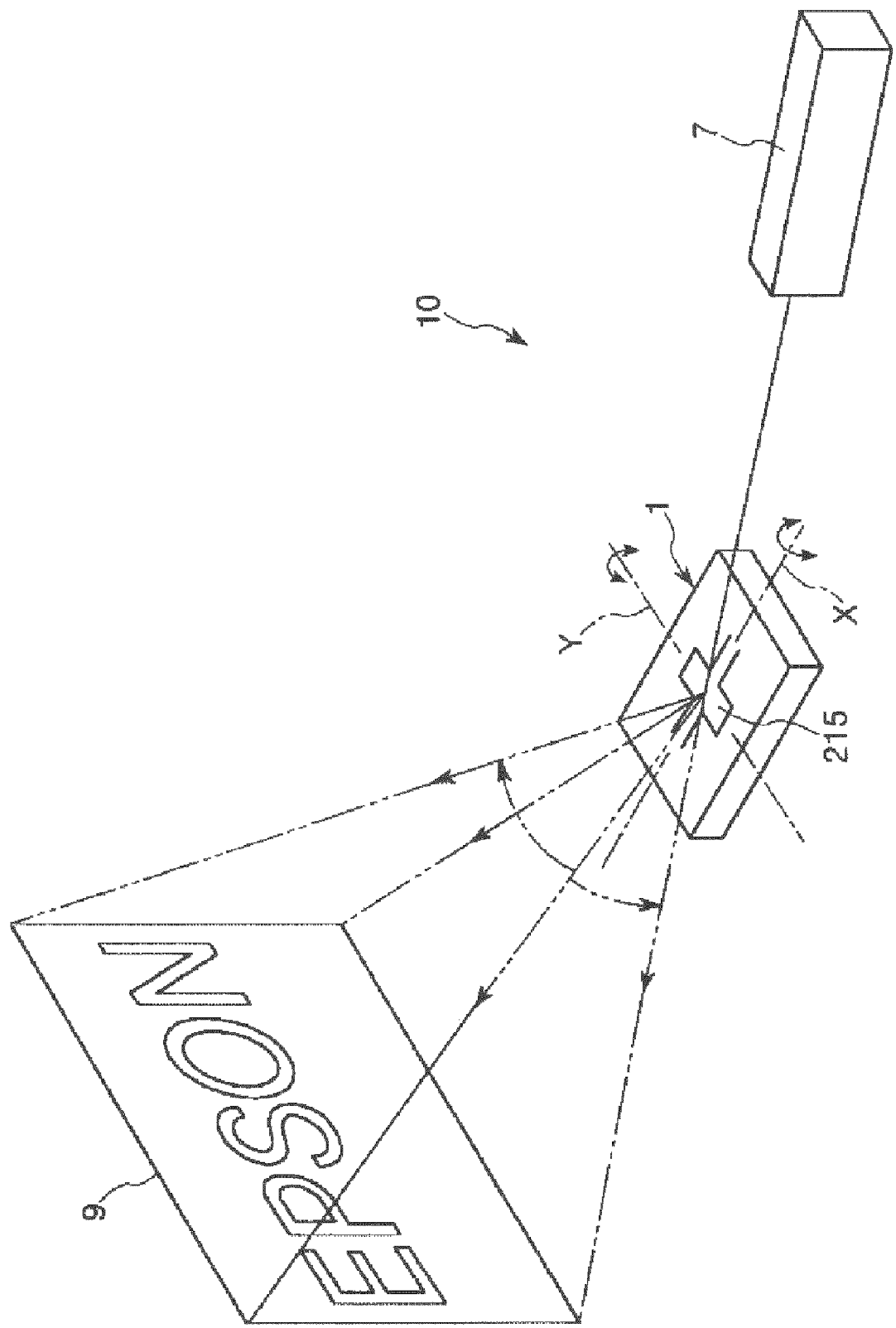
FIG. 6 is a schematic view showing an example of an image forming apparatus (imaging display) according to the invention.

FIG. 1 is a plan view of an actuator according to an embodiment of the invention, FIG. 2A is a sectional view taken along with the line A-A of FIG. 1, FIG. 2B is a sectional view taken along with the line B-B of FIG. 1, FIG. 3 is a sectional view taken along with the line C-C of FIG. 1, FIG. 4 is a block diagram illustrating the configuration of a control system of the actuator shown in FIG. 1, FIG. 5A through FIG. 5D are views each showing an exemplary generated voltage of a first voltage generating part and a second voltage generating part shown in FIG. 4, and FIG. 6 is a view showing an exemplary voltage to be applied to each of piezoelectric elements of the actuator shown in FIG. 1. Hereinafter, for the sake of the convenience of explanation, the near side of the page plane of FIG. 1 will be referred to as "upside", the far side of the page plane thereof "downside", the right side thereof "right" and the left side thereof "left". The upside of FIG. 2 and FIG. 3 will be referred to as "upside", the downside thereof "downside", the right side "right" and the left side "left".

As shown in FIG. 1 through FIG. 3, the actuator 1 includes a base 2 having a vibrating part including a one-degree-of-freedom vibrating system, and a supporting substrate 3 supporting the base 2. The actuator 1 further includes piezoelectric elements 41, 42, 43, 44 that drive the vibrating part 21 of the base 2.

The base 2 has the vibrating part 21 including a one-degree-of-freedom vibrating system and two pairs of beam portions 22, 23, 24, 25 that support the vibrating part 21, and a supporting part 26 supporting the vibrating part 21 through those beam portions 22, 23, 24, 25.

The vibrating part 21 has a mass portion 211, a pair of elastic portions 212, 213 that support the either side of the mass portion 211, and a frame body 214 supporting the pair of elastic portions 212, 213.

The mass portion 211 has a plate-like shape (disk-like shape in this embodiment). Near the upper surface of the mass portion 211 (the surface opposite to the supporting substrate 3), there is provided a light reflecting part (mirror part) having light reflective properties. As a result, the actuator 1 can be applied to optical devices such as an optical scanner, a light attenuator or an optical switch.

The mass portion 211 as thus described above is supported by the frame body 214 through the pair of elastic portions 212, 213.

The frame body 214 has a frame-like shape (a substantially rectangular annular shape in this embodiment) surrounding the outer periphery of the mass portion 211. That is to say, the frame body 214 has a frame-like shape. The mass portion 211 is provided at the inner side of the frame body while being spaced apart therefrom.

The pair of elastic portions 212, 213 connect the mass portion 211 to the frame body 214 in a rotatable manner. To be more specific, the pair of elastic portions 212, 213 can be elastically deformable, extend longitudinally, are provided coaxially to each other and support the mass portion 211 from the ether side. The pair of elastic portions 212, 213 thus constructed make it possible to rotate the mass portion 211 with respect to the frame body 214 in such a way that the elastic portions 212, 213 serve as a central axis of rotation to be torsionally deformed about a first axis X. That is to say, the vibrating part 21 has a one-degree-of-freedom vibrating system constructed by the mass portions 211 and the pair of elastic portions 212, 213.

The frame body 214 of the vibrating part 21 as thus described above is supported by a supporting part 26 through the two pairs of beam portions 22, 23, 24, 25. That is to say, the frame body 214 and the two pairs of beam portions 22, 23, 24, 25 form a vibrating system.

Of the two pairs of beam portions 22, 23, 24, 25, the pair of beam portions 22, 23 are provided one the one side of the vibrating part 21 and the pair of beam portions 24, 25 are provided on the other side of the vibrating part 21.

Those beam portions 22, 23, 24, 25 are arranged in a point symmetrical manner with respect to the center of the mass portion 211 seen in a plan view of the mass portion 211 of the vibrating part 21.

The supporting part 26 is formed so as to surround the outer periphery of the above-mentioned vibrating part 21.

The pair of beam portions 22, 23 connect the vibrating part 21 (specifically, the frame body 214) and the supporting part 26. In the same manner, the pair of beam portions 24, 25 connect the vibrating part 21 (specifically, the frame body 214) and the supporting part 26.

Each of the beam portions 22, 23, 24, 25 can be elastically deformed, has a longitudinal shape and extends in parallel with the center axis X of rotation of the mass portions 211. The two pairs of beam portions 22, 23, 24, 25 make it possible to rotate the frame body about a second axis (center axis of rotation) Y in such a way that the beam portions 22, 25 and the beam portions 23, 24 are bended in the opposite directions to be deformed. Further, it is also possible to rotate the frame body 214 about the first axis X in such a way that the beam portions 22, 23 and the beam portions 24, 25 are bended in the opposite directions to be deformed.

The base 2 having the vibrating part 21 as thus described above is made from, for example, silicon as a main material. The vibrating part 21, the beam portions 22, 23, 24, 25 and the supporting part 26 are integrally formed.

In order to drive the vibrating part 21 thus constructed, a piezoelectric element 41 is formed on the beam portion 22, a piezoelectric element 42 on the beam portion 23, a piezoelectric element 43 on the beam portion 24 and a piezoelectric element 44 on the beam portion 25.

In this case, the piezoelectric elements 41, 42 and the piezoelectric elements 42, 43 are arranged in a point symmetrical manner with respect to the center of the mass portion 211 seen in a plan view of the mass portion 211 of the vibrating part 21 as in the case of the pair of beam portions 22, 23 and the pair of beam portions 24, 25 as described above. Hereinafter, the piezoelectric elements 41, 42 are mainly described, for the same thing of the piezoelectric elements 41, 42 holds for the piezoelectric elements 43, 44.

The piezoelectric element 41 is bonded on the upper surface of the beam portion 22 and formed so as to telescope in the longitudinal direction of the beam portion 22. As a result, the piezoelectric element 41 can, due to its telescoping motion, bend the beam portion 22 to be deformed in the vertical direction. Further, the piezoelectric element 42 is bonded on the upper surface of the beam portion 23 and formed so as to telescope in the longitudinal direction of the beam portion 23. As a result, the piezoelectric element 42 can, due to its telescoping motion, bend the beam portion 23 to be deformed in the vertical direction.

In other words, the piezoelectric element 41 extends in the longitudinal direction of the beam portion 22 and telescopes in this extending direction, thereby bending the beam portion to be deformed. As a result, it makes possible to deform the beam portion 22 by the piezoelectric element 41 more reliably with a relatively simple construction. Likewise, the piezoelectric element 42 extends in the longitudinal direction of the beam portion 23 and telescopes in the extension direction, thereby bending the beam portion 23 to be deformed. As a result, it makes possible to deform the beam portion 23 by the piezoelectric element 42 more reliably with a relatively simple construction.

The piezoelectric elements 41, 42 thus constructed each have a piezoelectric layer formed from a piezoelectric material as a main material and a pair of electrodes sandwiching the piezoelectric layer.

The examples of the piezoelectric materials includes zinc oxide, aluminum nitride, lithium tantalate, lithium niobate, kalium niobate, lead zirconate titanate (PZT), barium titatate and so on. It is also possible to combine one or more of them. It is preferable that at least one of zinc oxide, aluminum nitride, lithium tantalate lithium niobate kalium niobate and lead zirconate titanate be a main part of the piezoelectric material used. By constructing the piezoelectric layer of the piezoelectric element 41 by using such materials, it becomes possible to drive the actuator 1 with higher frequency.

The piezoelectric element 41 is arranged such that it covers substantially the entire upper surface of the beam portion 22. Therefore, the piezoelectric element 41 is arranged across substantially the entire region of the beam portion 22 in the longitudinal direction. As a result, the actuation of the piezoelectric element 41 makes it possible to bend the beam portion 22 more widely to be deformed. Likewise, the piezoelectric element 42 is arranged such that it covers substantially the entire upper surface of the beam portion 23. Therefore, the piezoelectric element 42 is arranged across substantially the entire region of the beam portion 23 in the longitudinal direction. As a result, the actuation of the piezoelectric element 41 makes it possible to bend the beam portion 23 more widely to be deformed.

Such the piezoelectric elements 41, 42 are both provided on the upper surface of the base 2. As a result, when the piezoelectric elements 41, 42 are actuated to perform telescoping motion alternately (that is, the one extends while the other extracts), the pair of beam portions 22, 23 can be then bended to be deformed in the opposite directions.

The piezoelectric elements 43, 44 are constructed in the same manner as the above-mentioned piezoelectric elements 41, 42. Such the piezoelectric elements 43, 44 are both provided on the upper surface of the base 2 as in the case of the above-described piezoelectric elements 41, 42. As a result, when the piezoelectric elements 43, 44 are actuated to perform telescoping motion alternately (that is, the one extends while the other extracts), the pair of beam portions 24, 25 can be then bended to be deformed in the opposite directions.

The piezoelectric elements 41, 42, 43, 44 thus constructed are connected to a power supply circuit 5 described later (see FIG. 5A through FIG. 5D) to be supplied with power. It should be noted that the power supply circuit 5 will be described later in details.

The supporting substrate 3 supporting the above-mentioned base 2 is made from, for example, glass or silicon as a main material and bonded to the base 2. Note that the supporting substrate 3 and the base 2 may be bonded to each other through the intermediation of a bonding layer made mainly from, for example, glass, silicon or $SiO_2$.

As shown in FIG. 2 and FIG. 3, an opening 31 is formed in the part of the supporting substrate 3 corresponding the vibrating part 21.

The opening 31 forms a run off preventing the vibrating part 21 from contacting the supporting substrate at the time of vibration. As thus the opening (run off) 31 is provided, it is possible to prevent the upsizing of the actuator 1 as a whole while making it possible to set the swing angle (vibration) of the vibrating part 21 (of, for example, the mass portion 211 and the frame body 214) to be larger.

It should be noted that the above-mentioned run off is not necessarily opened (as an aperture) at the lower surface of the supporting substrate 3 (the surface opposite to the vibrating part 21) when with this construction the above-described effects can be sufficiently achieved. In other words, the run off may also be substituted by a recess formed on the upper surface of the supporting substrate 3.

With reference to FIG. 4 and FIGS. 5A through 5D, the power supply circuit 5 serving as a voltage applying unit that applies voltage to the piezoelectric elements 41, 42, 43, 44.

As shown in FIG. 4, the power supply circuit 5 has a first voltage generating part 51 that generates first voltage used for rotating the mass portion 211 about the first axis X, a second voltage generating part 52 that generates second voltage used for rotating the mass portion 211 about the second axis Y, and a voltage superimposing part 53 that superimposes the first voltage and the second voltage to be applied to the piezoelectric elements 41, 42, 43, 44.

As shown in the right side of FIG. 5A though FIG. 5D, the first power generating part 51 generates voltage (voltage for horizontal scanning) that periodically changes with a period $T_1$. In other words, the first voltage generating part 51 generates two kinds of first voltage $V_{11}$, $V_{12}$ that change periodically with frequency ($1/T_1$).

To be more specific, the first voltage generating part 51 generates as horizontal scanning voltage (horizontal scanning drive signal) applied to the piezoelectric elements 41, 42 the first voltage $V_{11}$ that changes periodically with the period $T_1$, as shown in the right side of FIG. 5A and FIG. 5B.

The first voltage $V_{11}$ has a wave form similar to a sine wave. Therefore, the actuator 1 can perform main scanning of light effectively. It should be noted that the wave form of the first voltage $V_{11}$ is not limited thereto.

In this case, the first frequency ($1/T_1$) is not particularly limited as long as it is suitable for horizontal scanning; however, it preferably is 10-40 kHz. Further, it is preferable to set the first voltage to be substantially the same as a torsion resonance frequency of the vibrating system constructed by the mass portion 211 and the elastic portions 212, 213. In other words, the torsion resonance frequency of the vibrating system constructed by the mass portion 211 and the elastic portions 212, 213 is preferably designated to be the same as the frequency that is suitable for horizontal scanning.

Further, the first voltage generating part 51 generates as horizontal scanning voltage (horizontal scanning drive signal) applied to the piezoelectric elements 43, 44 first voltage $V_{12}$ that changes periodically with the period $T_1$ as shown in the right side of FIG. 5C and FIG. 5D. The first voltage $V_{12}$ has the same wave form as the first voltage $V_{11}$, but has a phase, which is out of phase with the first voltage $V_{11}$ by 180°.

The second voltage generating part 52 generates voltage (voltage for vertical scanning) that changes periodically with a period $T_2$, which is different from the period $T_1$, as shown in the left side of FIG. 5A through FIG. 5D. That is to say, the second voltage generating part 52 generates second voltage $V_{21}$, $V_{22}$ that change periodically with two kinds of frequency ($1/T_2$), which is different from the first frequency ($1/T_1$).

To be more specific, the second voltage generating part 52 generates as vertical scanning voltage (vertical scanning drive signal) applied to the piezoelectric elements 41, 43 the second voltage $V_{21}$ that changes periodically with the period $T_2$, which is different from the period $T_1$, as shown in the left side of FIG. 5A and FIG. 5C.

The second voltage $V_{21}$ has a wave form similar to a saw tooth wave. Therefore, the actuator 1 can perform sub-scanning of light effectively. It should be noted that the wave form of the second voltage $V_{21}$ is not limited thereto.

In this case, the second frequency ($1/T_2$) is not particularly limited as long as it is different from the first frequency ($1/T_1$) and suitable for vertical scanning; however, it preferably is smaller than the first frequency ($1/T_1$). That is to say, the period $T_2$ is preferably longer than the period $T_1$.

Further, the second frequency ($1/T_2$) is preferably 40-80 Hz (approximately 60 Hz), thereby making it possible to rotate the mass portion 211 respectively about the two axes intersecting with each other (the first axis X and the second axis Y) with a frequency suitable for performing drawing on a display.

Furthermore, the second voltage generating part 52 generates as vertical scanning voltage (vertical scanning drive signal) applied to the piezoelectric elements 42, 44 second voltage $V_{22}$ that changes periodically with the period $T_2$ as shown in the left side of FIG. 5B and FIG. 5D. The second voltage $V_{22}$ has the same wave form as the second voltage $V_{21}$.

The first voltage generating part 51 and the second voltage generating part 52 thus constructed are both connected to a control part (synchronizing signal generating circuit) and driven on the basis of signals from the control part 6.

The voltage superimposing part 53 is connected to the first voltage generating part 51 and the second voltage generating part 52. The voltage superimposing part 53 has an adder 531 that is used for applying voltage to the piezoelectric element 41, an adder 532 that is used for applying voltage to the piezoelectric element 42, an adder 533 that is used for applying voltage to the piezoelectric element 43 and an adder 534 that is used for applying voltage to the piezoelectric element 44.

The adder 531 receives first voltage $V_{11}$ from the first voltage generating part 51 and second voltage $V_{21}$ from the second voltage generating part 52 to superimpose those voltages and apply the superimposed voltage to the piezoelectric element 41.

The adder 532 receives first voltage $V_{11}$ from the first voltage generating part 51 and second voltage $V_{22}$ from the second voltage generating part 52 to superimpose those voltages and apply the superimposed voltage to the piezoelectric element 42.

The adder 532 receives first voltage $V_{11}$ from the first voltage generating part 51 and second voltage $V_{22}$ from the second voltage generating part 52 to superimpose those voltages and apply the superimposed voltage to the piezoelectric element 42.

The adder 533 receives first voltage $V_{12}$ from the first voltage generating part 51 and second voltage $V_{21}$ from the second voltage generating part 52 to superimpose those voltages and apply the superimposed voltage to the piezoelectric element 43.

The adder 534 receives first voltage $V_{12}$ from the first voltage generating part 51 and second voltage $V_{22}$ from the second voltage generating part 52 to superimpose those voltages and apply the superimposed voltage to the piezoelectric element 44.

The actuator 1 thus constructed is driven as follows:

For instance, the voltages $V_{11}$ and $V_{21}$ as shown in FIG. 5A are superimposed to be applied to the piezoelectric element 41, and the voltages $V_{11}$ and $V_{22}$ as shown in FIG. 5B are superimposed to be applied to the piezoelectric element 42. In synchronization with this, the voltages $V_{12}$ and $V_{21}$ as shown in FIG. 5C are superimposed to be applied to the piezoelectric element 43, and the voltages $V_{12}$ and $V_{22}$ as shown in FIG. 5D are superimposed to be applied to the piezoelectric element 44.

Then, the state in which the piezoelectric elements 41, 42 extend and the piezoelectric elements 43, 44 are contracted with the first period ($1/T_1$) and the state in which the piezoelectric elements 41, 43 extend and the piezoelectric elements 42, 44 are contracted with the second period ($1/T_2$) are alternately repeated.

In other words, the ration of the range, within which the piezoelectric elements 41, 43 can telescope (the length, across which the piezoelectric elements 41, 43 can displace,), and the range, within which the piezoelectric elements 42, 44 can telescope (the length, across which the piezoelectric elements 42, 44 can displace) is made to change with the second period ($1/T_2$), while the piezoelectric elements 41, 42 and the piezoelectric elements 43, 44 are made to extend in the opposite directions with the first period ($1/T_1$).

As the piezoelectric elements 41 through 44 thus operate, mainly the respective beam portions 22, 23, 24, 25 are bended to be deformed while the mass portion 211 rotates (vibrates) about the first axis X with the first frequency ($1/T_1$) and about the second axis Y with the second frequency ($1/T_2$).

As described above, at the actuator 1, the voltage superimposed by the voltage superimposing part 53 is applied to the respective piezoelectric elements 41, 42, 43, 44, thereby making the mass portion 211 to rotate about the first axis X, which extends along the pair of elastic portions 212, 213, with the first frequency ($1/T_1$) while rotating about the second axis Y intersecting with the first axis X with the second frequency ($1/T_2$).

As a result, it becomes possible to rotate the mass portion 211 respectively about the two axes intersecting with each other while achieving reduction in cost and miniaturization.

In particular, it is possible to reduce the number of the piezoelectric elements serving as a drive source (in this embodiment, four piezoelectric elements), thereby making it possible to achieve a simple and small construction.

Further, by changing the first voltage and the second voltage as appropriate, it becomes possible to obtain desired vibration behavior without any need of changing the design of the base 2, the piezoelectric elements 41, 42, 43, 44 or the like.

Furthermore, the frame body 214, which has a frame-like shape and surrounds the outer periphery of the mass portion 211, is supported by the two pairs of beam portions 22, 23, 24, 25 and supports in turn the mass portion 211 through the pair of elastic portions 212, 213. As a result, it becomes possible to allow the mass portion 211 to rotate about the first axis X, which extends along the pair of elastic portions 212, 213, with the first frequency ($1/T_1$) while rotating about the second axis Y with the second frequency ($1/T_2$) with lower power and more smoothly.

Moreover, each of the pair of the beam portions is arranged at the either side of the vibrating part through the same. As a result, it becomes possible to allow the mass portion about the first axis, which extends along the pair of the elastic portions, with the first frequency while rotating about the second axis with the second frequency more smoothly.

The two pairs of beam portions 22, 23, 24, 25 are arranged in a point symmetrical manner with respect to the center of the mass portion 211 seen in a plan view of the mass portion 211. As a result, it becomes possible to allow the mass portion 211 to rotate about the first axis X, which extends along the pair of elastic portions 212, 213, with the first frequency ($1/T_1$) while rotating about the second axis Y with the second frequency ($1/T_2$) with a simpler construction and more smoothly.

Further, each of the piezoelectric elements 41, 42, 43, 44 extends in the longitudinal direction of the beam portion 23 and telescopes in the extension direction, thereby bending the beam portions 22, 23, 24, 25 to be deformed. As a result, it becomes possible to allow the mass portion 211 to rotate about the first axis X, which extends along the pair of elastic portions 212, 213, with the first frequency ($1/T_1$) while rotating about the second axis Y with the second frequency ($1/T_2$) with lower power and larger rotating angle.

Furthermore, each of the beam portions 22, 23, 24, 25 extends in parallel with the first axis X, so the actuator 1 can be further downsized while making the rotating angle of the mass portion 211 larger.

The respective piezoelectric elements 41, 42, 43, 44 are arranged across substantially the entire region of the corresponding beam portions 22, 23, 24, 25 in the longitudinal direction. As a result, the actuator 1 can be further downsized while making the rotating angle of the mass portion 211 larger.

The actuator 1 as thus described above can be preferably applied to an optical scanner provided in an image forming apparatus such as a laser printer, a barcode reader, a confocul scanning laser microscope or a display for imaging.

Hereinafter, a case in which the actuator 1 is used as an optical scanner for a display for imaging as an example of the image forming apparatus with reference to FIG. 6 and FIG. 7.

Figure 7:
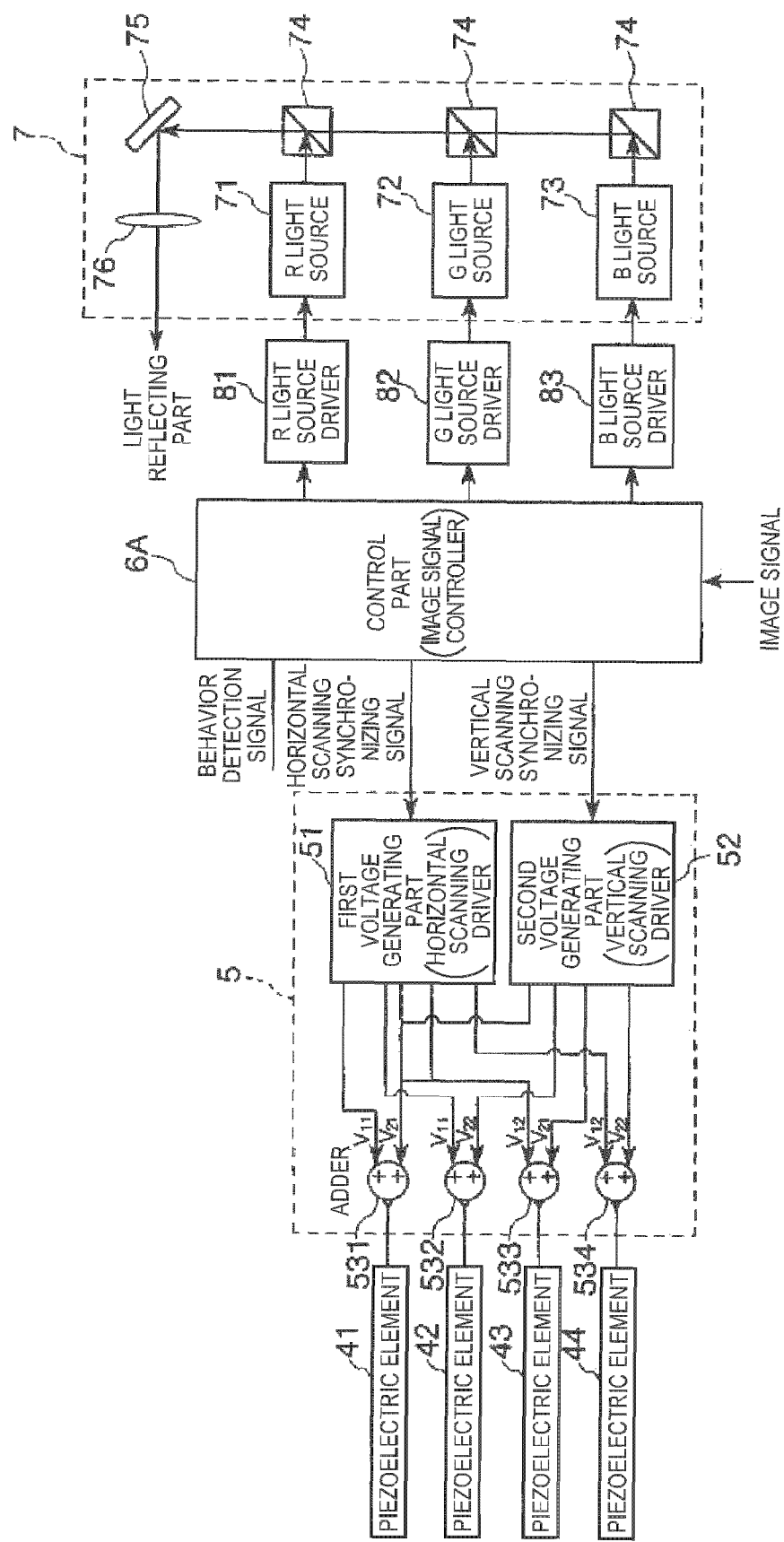
FIG. 7 is a block diagram showing a configuration of a control system of the image forming apparatus shown in FIG. 6.

FIG. 6 is a schematic view illustrating an example of the image forming apparatus (imaging display) according to the invention, and FIG. 7 is a block diagram illustrating a configuration of the control system of the image forming apparatus shown in FIG. 6.

As shown in FIG. 6, the image forming apparatus 10 includes the actuator 1 as an optical scanner and a light irradiating apparatus 7 that irradiates the light irradiating apparatus 7 with light and forms image (performs drawing) on a screen 9 by performing main scanning and sub-scanning with light from the light irradiating apparatus 7 by using the actuator 1

Note that the screen 9 may be integrated with the main body of the image forming apparatus 10 or be separated therefrom. Further, it is possible to irradiate the front surface of the screen 9 (the visible surface) with light from the light irradiating apparatus 7 thereby producing a screen display, or to irradiate the back surface of the screen 9 (the surface opposite to the visible surface) with light from the light irradiating apparatus 7 thereby allowing light to pass through the surface and producing a screen display thereon.

As shown in FIG. 7, the light irradiating apparatus 7 has three light sources 71, 72, 73 respectively for red (R), green (G), blue (B), a cross dichroic prism (X prism) 74, a mirror 75, and a lens 76.

The light source 71 generates red light and is connected to a light source driver 81 that drives the light source 71. The light source 72 generates green light and is connected to a light source driver 82 that drives the light source 72. The light source 73 generates blue light and is connected to a light source driver 83 that drives light source 73.

Each of the light source drivers 81, 82, 83 is connected to a control part 6A and operates according to signals from the control part 6A. In this case, the control part 6A receives image information (image signal) from a host computer (not shown) and allows according to the image information each of the light source drivers 81, 82, 83 to operate. The control part 6A controls the drive of the power supply circuit 5 on the basis of behavior information of the actuator 1 (mass portion 211) detected by a detecting unit (not shown).

In the image forming apparatus 10 thus constructed, the actuator 1 (light reflecting part 215) is irradiated with light of each of the colors from each of the light sources 71, 72, 73 via the cross dichroic prism 74, the mirror 75 and the lens 76. In this case, red light from the light source 71, green light from the light source 72 and blue light from the light source 73 are synthesized at the cross dichroic prism 74. Further, the intensity of light emitted from the light sources 71, 72, 73 of each of the colors changes according to image information received from the host computer (not shown).

The screen 197 is irradiated with light reflected at the light reflecting part 215 (the synthesized light of three colors).

At this time, as the mass portion 211 of the actuator 1 rotates about the first axis X, the light reflected at the light reflecting part 215 is used for performing scanning (main scanning) in the lateral direction of the screen 9. Meanwhile, as the mass portion 211 of the actuator 1 rotates about the second axis Y the light reflected at the light reflecting part 215 is used for performing scanning (sub scanning) in the longitudinal direction of the screen 9.

As described above, the image forming apparatus 10 performs image forming (drawing) on the screen 9. In the case of such the image forming apparatus 10, it is possible to perform two dimensional scanning, that is, main scanning (horizontal scanning) and sub-scanning (vertical scanning) by using only one actuator 1, thereby achieving reduction in cost and miniaturization.

The actuator according to the invention has been described above with reference to the embodiment show; however, the present invention is not limited thereto. As to the actuator according to the invention, for example, it is possible to substitute the construction of each of the components with any possible construction, with which the same function can be obtained, or to add any possible construction thereto.

For example, according to the above-described embodiment, the actuator 1 having the tow pairs of beam portions has been described; however, the number of the pair of beam portions may be one or more than three, as long as the beam portions make it possible to allow the mass portion to rotate respectively about two axes intersecting with each other.

Further, the form of beam, the size, the arrangement etc. are not limited to those according to the above-mentioned embodiment, as long as the beam portions make it possible to allow the mass portion to rotate respectively about two axes intersecting with each other.

According to the above embodiment, the piezoelectric elements are bonded only on the upper surface of the beam portions; however, it should not be construed restrictively. The piezoelectric elements may be bonded on the lower surface of the beam portions. A part of the piezoelectric elements may be bonded on the upper surface of the beam portions and another part of the piezoelectric elements may be bonded on the lower surface of the beam portions. In this case, the plural piezoelectric elements are preferably arranged symmetrically with respect to the first axis and/or the second axis. As a result, it is no more necessary to generate various voltages having phase difference at the first voltage generating part and the second voltage generating part, so the constructions of the first voltage generating part and the second voltage generating part can be simplified.

Furthermore, according to the above-described embodiment, the construction has been described, which is substantially symmetrical (left-right symmetry) with respect to the first axis or the second axis, seen in a plan view; however, an asymmetrical construction may be employed.

Moreover, according to the above embodiment, the construction has been described, in which the light reflecting part is provided on the upper surface (the surface opposite to the supporting substrate) of the mass portion; however, it is possible to employ the construction, in which the light reflecting part is provided on the surface opposite to the supporting substrate of the mass portion, or the construction, in which the light reflecting part is provided on the either surface of the mass portion.

What is claimed is:

1. An actuator comprising:
   a mass portion;
   a vibrating part having a pair of elastic portions supporting the mass portion;
   at least one pair of beam portions supporting the vibrating part;
   a piezoelectric element bonded on each of the beam portions;
   voltage applying means that applies voltage to each of the piezoelectric elements so that each of the beam portions is bended to be deformed so as to drive the vibrating part,
   wherein the voltage applying means includes:
      a first voltage generating part that generates first voltage periodically changing with a first frequency;
      a second voltage generating part that generates second voltage periodically changing with a second frequency different from the first frequency; and
      a voltage superimposing part that superimposes the first voltage and the second voltage, and
   wherein the voltage superimposed at the voltage superimposing part is applied to each of the piezoelectric elements to allow the mass portion to rotate about the first axis extending along the pair of elastic portions with the first frequency while rotating about the second axis intersecting with the first axis with the second frequency.

2. The actuator according to claim 1, wherein in the voltage applying means, the first voltage generating part generates two kinds of the first voltage, the two kinds of the first voltage being out of phase with each other by 180°, the voltage superimposing part superimposes each of the two kinds of the first voltage and the second voltage so that the superimposed voltage at the voltage superimposing part is applied corresponding to a pair of the piezoelectric elements.

3. The actuator according to claim 2, wherein the vibrating part is supported by the at least one pair of beam portions, supports the mass portion through the pair of beam portions, and is provided with a frame body having a frame-like shape surrounding the outer periphery of the mass portion.

4. The actuator according to claim 1, wherein the beam portions are arranged in pairs through the vibrating part on the either side of the vibrating parts.

5. The actuator according to claim 4, wherein:
the mass portion has a plate-like shape; and
the two pairs of beam portions are arranged in a point symmetrical manner with respect to the center of the mass portion seen in a plan view of the mass portion.

6. The actuator according to claim 1, wherein:
each of the beam portions extends in longitudinal direction; and
each of the piezoelectric elements extends in the longitudinal direction and telescopes in the extension direction of the beam portions to bend the beam portions to be deformed.

7. The actuator according to claim 6, wherein each of the beam portions extends in parallel with the first axis.

8. The actuator according to claim 6, wherein each of the piezoelectric elements is arranged across substantially the entire region of the corresponding beam portion in the longitudinal direction.

9. The actuator according to claim 1, wherein the first frequency is larger than the second frequency.

10. The actuator according to claim 1, wherein the first frequency is the same as the torsion resonance frequency of the vibrating system constructed by the mass portion and the vibrating part.

11. The actuator according to claim 1, wherein the mass portion includes a light reflecting part having light reflecting properties.

12. An optical scanner, comprising:
a vibrating part having
a mass portion having a light reflecting part having light reflecting properties and a pair of elastic portions supporting the mass portion;
at least one pair of beam portions capable of being bended to be deformed and supporting the vibrating part;
a piezoelectric element bonded on each of the beam portions; and
voltage applying means that applies voltage to each of the piezoelectric elements so that each of the beam portions is bended to be deformed so as to drive the vibrating part and light reflected at the light reflecting part is used for scanning,
wherein the voltage applying means includes:
a first voltage generating part that generates a first voltage periodically changing with a first frequency;
a second voltage generating part that generates a second voltage periodically changing with a second frequency different from the first frequency; and
a voltage superimposing part that superimposes the first voltage and the second voltage; and
wherein the superimposed voltage at the voltage superimposing part is applied to each of the piezoelectric elements to allow the mass portion to rotate about the first axis extending along the pair of elastic portions with the first frequency while rotating about the second axis intersecting with the first axis with the second frequency.

13. An image forming apparatus, comprising:
a vibrating part having
a mass portion having a light reflecting part having light reflecting properties and a pair of elastic portions supporting the mass portion;
at least one pair of beam portions capable of being bended to be deformed and supporting the vibrating part;
a piezoelectric element bonded on each of the beam portions;
light irradiating means that irradiates the light reflecting part with light; and
voltage applying means that applies voltage to each of the piezoelectric elements so that each of the beam portions is bended to be deformed so as to drive the vibrating part and light reflected at the light reflecting part is used for scanning to form image on an object, wherein the voltage applying means includes:
a first voltage generating part that generates a first voltage periodically changing with a first frequency;
a second voltage generating part that generates a second voltage periodically changing with a second frequency different from the first frequency; and
a voltage superimposing part that superimposes the first voltage and the second voltage; and
wherein the superimposed voltage at the voltage superimposing part is applied to each of the piezoelectric elements to allow the mass portion to rotate about the first axis extending along the pair of elastic portions with the first frequency while rotating about the second axis intersecting with the first axis with the second frequency.

* * * * *